United States Patent
Tschache

(10) Patent No.: US 10,057,071 B2
(45) Date of Patent: Aug. 21, 2018

(54) COMPONENT FOR CONNECTING TO A DATA BUS, AND METHODS FOR IMPLEMENTING A CRYPTOGRAPHIC FUNCTIONALITY IN SUCH A COMPONENT

(71) Applicant: VOLKSWAGEN AG, Wolfsburg (DE)

(72) Inventor: Alexander Tschache, Wolfsburg (DE)

(73) Assignee: Volkswagen AG (DE)

( * ) Notice: Subject to any disclaimer, the term of this patent is extended or adjusted under 35 U.S.C. 154(b) by 0 days.

(21) Appl. No.: 15/434,155

(22) Filed: Feb. 16, 2017

(65) Prior Publication Data

US 2017/0244566 A1  Aug. 24, 2017

(30) Foreign Application Priority Data

Feb. 18, 2016 (DE) .......................... 10 2016 001 848
Jun. 16, 2016 (DE) .......................... 10 2016 210 786

(51) Int. Cl.
*H04L 29/06* (2006.01)
*H04L 9/32* (2006.01)
*H04W 4/04* (2009.01)

(52) U.S. Cl.
CPC .......... *H04L 9/3247* (2013.01); *H04L 9/3242* (2013.01); *H04L 63/061* (2013.01); *H04L 63/0869* (2013.01); *H04W 4/046* (2013.01)

(58) Field of Classification Search
CPC ... H04L 9/3247; H04L 63/061; H04L 9/3242; H04L 63/0869; H04W 4/046
See application file for complete search history.

(56) References Cited

U.S. PATENT DOCUMENTS

| | | | | |
|---|---|---|---|---|
| 7,131,001 B1* | 10/2006 | Johnson | .................. | G06F 21/10 280/277 |
| 2003/0086570 A1* | 5/2003 | Riedel | ................. | G06F 21/6209 380/277 |
| 2004/0003245 A1* | 1/2004 | Dabbish | .................. | B60R 25/04 713/168 |
| 2007/0101158 A1* | 5/2007 | Elliott | ................. | G06F 12/1408 713/193 |

(Continued)

FOREIGN PATENT DOCUMENTS

| | | |
|---|---|---|
| DE | 102007058975 A1 | 6/2009 |
| DE | 102010004786 A1 | 7/2011 |
| DE | 102011002713 A1 | 7/2012 |

(Continued)

OTHER PUBLICATIONS

Bernstein; The Poly1305-AES message-authentication code; International Workshop on Fast Software Encryption; 2005; pp. 32-49.

(Continued)

*Primary Examiner* — Meng Li
(74) *Attorney, Agent, or Firm* — Barnes & Thornburg LLP

(57) ABSTRACT

A component for connecting to a data bus wherein the component implements at least one cryptographic functionality. Also disclosed is a method for implementing a cryptographic functionality in such a component. The implementation of the cryptographic functionality is based on a specified selection of cryptographic functions, methods and protocols adapted to the performance of the component, wherein minimum lengths are defined for the respectively used cryptographic keys.

20 Claims, 3 Drawing Sheets

(56) References Cited

U.S. PATENT DOCUMENTS

| | | | | |
|---|---|---|---|---|
| 2008/0192929 | A1* | 8/2008 | Knechtel | G06F 21/602 380/44 |
| 2009/0217031 | A1* | 8/2009 | Kuhls | H04L 9/0822 713/153 |

FOREIGN PATENT DOCUMENTS

| | | | |
|---|---|---|---|
| DE | 102012224194 A1 | 6/2014 | |
| DE | 102014019496 A1 | 6/2015 | |
| DE | 102015103020 A1 | 9/2015 | |
| EP | 1518349 A1 | 3/2005 | |
| EP | 1525708 A1 | 4/2005 | |
| WO | 2004095238 A1 | 11/2004 | |
| WO | 2012126547 A1 | 9/2012 | |

OTHER PUBLICATIONS

Bernstein; Curve25519: new Diffie-Hellman speed records; International Workshop on Public Key Cryptography; 2006; pp. 207-228.

Bernstein; The Salsa20 family of stream ciphers; New stream cipher designs; 2008; pp. 84-97.

Bernstein; ChaCha, a variant of Salsa20; Workshop Record of SASC; 2008; vol. 8.

Bogdanov et al.; Present: An ultra-lightweight block cipher; International Workshop on Cryptographic Hardware and Embedded Systems; 2007; pp. 450-466.

Chen; Recommendation for key derivation using pseudorandom functions; NIST special publication; 2008; vol. 800; p. 108.

Dworkin; SP 800-38D. Recommendation for block cipher modes of operation: Galois/Counter Mode (GCM) and GMAC; National Institute of Standards & Technology; 2007.

Kaliski; PKCS# 5: Password-based cryptography specification version 2.0; 2000.

Percival; Stronger key derivation via sequential memory-hard functions; Self-published; 2009; pp. 1-16.

Provos et al.; A Future-Adaptable Password Scheme; USENIX Annual Technical Conference, FREENIX Track; 1999; pp. 81-91.

Turner; The keyed-hash message authentication code (hmac); Federal Information Processing Standards Publication; 2008.

Search Report from German Patent Application No. 10 2016 210 786.0; Nov. 30, 2016.

* cited by examiner

US 10,057,071 B2

COMPONENT FOR CONNECTING TO A DATA BUS, AND METHODS FOR IMPLEMENTING A CRYPTOGRAPHIC FUNCTIONALITY IN SUCH A COMPONENT

PRIORITY CLAIM

This patent application claims priority to German Patent Application Nos. 10 2016 001 848.8, filed 18 Feb. 2016, and 10 2016 210 786.0, filed 16 Jun. 2016, the disclosures of which are incorporated herein by reference in their entirety.

SUMMARY

Illustrative embodiments relate to a component for connecting to a data bus, the component implementing at least one cryptographic functionality, and also a method for implementing a cryptographic functionality in such a component.

BRIEF DESCRIPTION OF THE DRAWINGS

Further features will become evident from the following description and the attached claims in conjunction with the figures.

DETAILED DESCRIPTION

Figure 1:
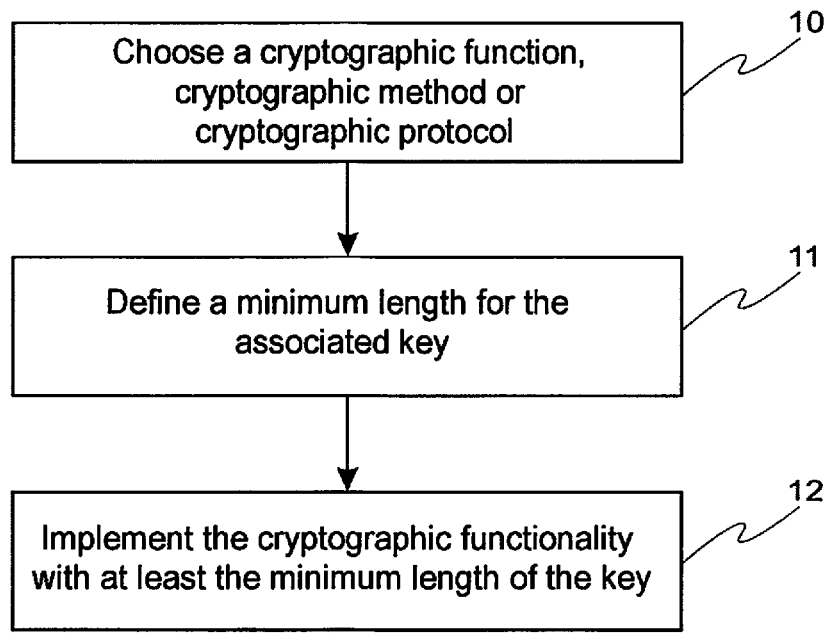
FIG. 1 shows schematically a method for implementing a cryptographic functionality in a component for connecting to a data bus.

A multiplicity of public documents exist which make proposals for the use of cryptographic functions, for example, from the European Union Agency for Network and Information Security [1], the European Network of Excellence for Cryptology [2] and from the BSI [3]. However, most documents are not geared towards a specific industrial sector. Details are given in relation to secure functions and key lengths, but these are not standardized and leave room for interpretation. Furthermore, the number of predefined functions is in some instances very large, making the selection difficult for laymen.

In today's systems with diverse components that are networked with one another, for example, in motor vehicles with a multiplicity of control units, a range of cryptographic functions of differing quality are used. In some cases, these functions are used in components that have been specified directly by the system manufacturer, but in other cases suppliers of the components also develop protection methods at their own discretion, often without detailed agreement with system manufacturer. As a result, the different components and functions of the system must therefore be checked for their cryptographic functionality, which requires a huge amount of time.

Document DE 10 2010 004 786 A1 discloses a computer-supported development environment for the implementation of security applications in a vehicle architecture. The developer is supplied with a multiplicity of security modules which he can select and in some cases also adapt as required without detailed knowledge of the individual modules. The security modules relate, inter alia, to communication between internal and external entities, authentication of entities, retrieval and management of security rules, secure storage, detection of manipulations and the provision of cryptographic services. However, this approach does not solve the problem of checking the protection methods developed by suppliers at their own discretion.

Disclosed embodiments provide a component for connecting to a data bus, the component implementing at least one cryptographic functionality with a reduced development overhead.

Disclosed embodiments also provide a solution for the implementation of a cryptographic functionality in a component for connecting to a data bus which avoids the above-mentioned drawbacks.

According to at least one disclosed embodiment, a component for connecting to a data bus implements at least one cryptographic functionality, wherein the implementation of the cryptographic functionality is based on a specified selection of cryptographic functions, methods and protocols adapted to the performance of the component, and wherein minimum lengths are defined for the respectively used cryptographic keys.

According to a further disclosed embodiment, a method for implementing a cryptographic functionality in a component for connecting to a data bus comprises the following operations:

choosing at least one cryptographic function, cryptographic method or cryptographic protocol from a selection of specified cryptographic functions, methods and protocols adapted to the performance of the component;

defining a minimum length for the cryptographic key which is used for the chosen cryptographic function, the chosen cryptographic method or the chosen cryptographic protocol; and implementing the cryptographic functionality using the chosen cryptographic function, the chosen cryptographic method or the chosen cryptographic protocol with at least the defined minimum length of the cryptographic key.

The number of usable functions is restricted by the specified selection of cryptographic functions, methods and protocols, so that a readily understandable number of variants is available. This restriction is binding on all component developers. This creates a consistently high level of protection which can simultaneously be easily verified. In addition, the selection allows the cryptographic functions, methods and protocols to be adapted to the requirements of the field of use of the component. The component may, for example, be a control unit for a motor vehicle. In this case, the cryptographic functions, methods and protocols are reduced to those which are also actually usable in the vehicle. The selectable functions are specified according to the capabilities of the component. This applies to both the functions per se and to the key lengths, which similarly influence the processing performance. The final selection from the list of approved functions is made, e.g., depending on the memory (ROM or RAM) available to the component, the processing power or the allowed processing time.

According to at least one disclosed embodiment, the specified selection of cryptographic functions, methods and protocols specifies requirements for one or more of the following areas: symmetric block ciphers, stream ciphers, asymmetric algorithms, hash algorithms, encryption methods, signatures, key derivation, authentication, identification, key exchange and random number generators. These areas represent the essential foundations for cryptographic functionalities, so that the typical applications can be covered by the specified selection.

According to at least one disclosed embodiment, the implemented cryptographic functionality is a signature, the signature length of which is chosen depending on the transmission capacity of data bus. In the signature methods of the selection, the only possibility of attack is to try out all possible signatures. If the data bus has a limited transmission capacity, adequate protection is guaranteed even with a shorter signature length, since the data bus permits only a limited number of falsification attempts per time unit. The requirements for the performance of the component are reduced by the shorter signature length.

According to at least one disclosed embodiment, two or more of the disclosed components are interconnected in a system via a data bus. The system may, for example, be a vehicle, in particular a motor vehicle.

For a better understanding, embodiments are explained in more detail below with reference to the figures. The scope is obviously not restricted to these embodiments and the described features can also be combined or modified without exceeding the protective scope as defined in the attached claims.

FIG. 1 shows schematically a method for implementing a cryptographic functionality in a component for connecting to a data bus. In a first operation, at least one cryptographic function, cryptographic method, or cryptographic protocol is chosen 10 from a specified selection of cryptographic functions, methods and protocols adapted to the performance of the component. The specified selection of cryptographic functions, methods and protocols specifies requirements for one or more of the following areas: symmetric block ciphers, stream ciphers, asymmetric algorithms, hash algorithms, encryption methods, signatures, key derivation, authentication, identification, key exchange and random number generators. If the cryptographic functionality is a signature, its signature length can be defined depending on the transmission capacity of the data bus. Furthermore, a minimum length is defined 11 for the cryptographic key which is used for the chosen cryptographic function, the chosen cryptographic method or the chosen cryptographic protocol. Finally, the cryptographic functionality is implemented 12 using the chosen cryptographic function, the chosen cryptographic method or the chosen cryptographic protocol with at least the defined minimum length of the cryptographic key.

Figure 2:
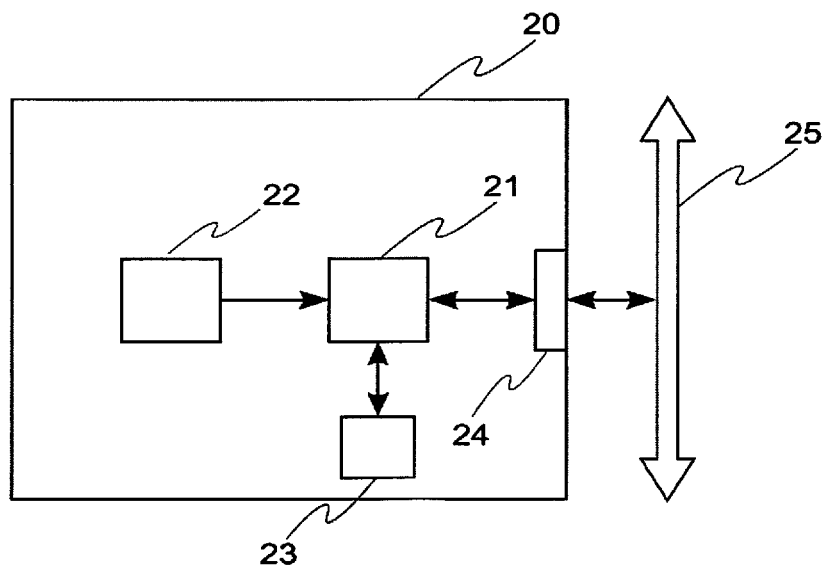
FIG. 2 shows a first example embodiment of a component for connecting to a data bus, the component implementing at least one cryptographic functionality.

FIG. 2 shows a simplified schematic presentation of a first embodiment of a component 20 for connecting to a data bus 25, the component implementing at least one cryptographic functionality. For this purpose, the component 20 uses, for example, a cryptographic module 21. The implementation of the cryptographic functionality by the cryptographic module 21 is based on a specified selection of cryptographic functions, methods and protocols adapted to the performance of the component 20, wherein minimum lengths are defined for the respectively used cryptographic keys. The specified selection of cryptographic functions, methods and protocols specifies requirements for one or more of the following areas: block ciphers, stream ciphers, asymmetric algorithms, hash algorithms, encryption methods, signatures, key derivation, authentication, identification, key exchange and random number generators. If the cryptographic functionality is a signature, its signature length can be defined depending on the transmission capacity of the data bus. For example, the functions, methods and protocols chosen from the selection and actually available are provided by a function module 22. However, they can also be implemented in the cryptographic module 21 itself. The component 20 has an interface 24 for connecting to the data bus 25. The component 20 can be connected to further components via the data bus 25. Data processed by the cryptographic module 21 can be provided via the interface 24. In addition, they can be stored in a memory 23 of the component 20. The cryptographic module 21 and the function module 22 can be implemented as dedicated hardware, for example, as integrated circuits. However, they may obviously also be implemented in partially or totally combined form, or as software running on a suitable processor.

Figure 3:
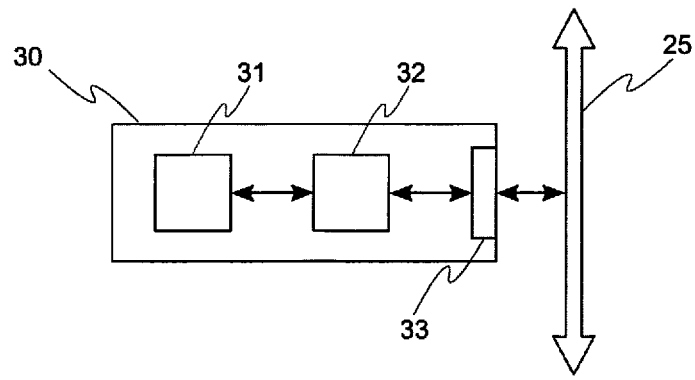
FIG. 3 shows a second example embodiment of a component for connecting to a data bus, the component implementing at least one cryptographic functionality.

FIG. 3 shows a simplified schematic presentation of a second embodiment of a component 30 for connecting to a data bus 25, the component implementing at least one cryptographic functionality. The component 30 has a processor 32 and a memory 31. The component 30 is, for example, a computer or a control unit. Instructions which cause the component 30 to provide a cryptographic functionality during execution by the processor 32 are stored in the memory 31. The component 30 has an interface 33 for connecting to the data bus 25, for example, to communicate with further components. Data generated by the processor 32 are provided via the interface 33. In addition, they may be stored in the memory 31.

The processor 32 may comprise one or more processor units, for example, microprocessors, digital signal processors or combinations thereof.

The memories 23, 31 of the described embodiments may have volatile and/or non-volatile memory areas and may comprise a wide variety of memory devices and memory media, for example, hard disks, optical storage media or semiconductor memories.

An embodiment will be described in detail below with regard to the approved cryptographic algorithms and methods. A number of terms and abbreviations will first be defined for this purpose. Depending on the field of application and required security, other cryptographic algorithms and methods may also be approved or modified parameters may be specified for them.

Terms

Perfect Forward Secrecy: New, random keys are negotiated between the communication partners for each communication session. The breaking of a participating key has no influence on the protection of previous communication sessions.

Individually for each component: The described value is different for each produced component. A component means individually produced, single components, not a component family.

Cryptographic algorithms: This refers to mathematical primitives which process data, e.g., encryption functions or hash functions.

Cryptographic data: This refers to secret data which occur during the use of cryptographic algorithms and methods, e.g., keys, subkeys, random numbers and intermediate values.

Cryptographic methods: This refers to methods based on cryptographic algorithms, e.g., authentication methods or key derivation methods.

Random: The probability that a specific value is selected from an entire range of possible values corresponds to the uniform distribution. In other words, every element has the same probability of being selected. Outputs of a cryptographically secure random generator, as described below, are random.

Abbreviations

AES Advanced Encryption Standard
CBC Cipher Block Chaining
CMAC Cipher-based Message Authentication Code
CTR Counter
DH Diffie-Hellman
ECB Electronic Code Book
ECC Elliptic Curve Cryptography
ECDH Elliptic Curve Diffie-Hellman
ECDSA Elliptic Curve Digital Signature Algorithm
ECIES Elliptic Curve Integrated Encryption Scheme
EdDSA Edwards-curve Digital Signature Algorithm
GCM Galois/Counter Mode
GMAC Galois Message Authentication Code
HMAC Hash-based Message Authentication Code
KEM Key Encapsulation Method
MAC Message Authentication Codes
OAEP Optimal Asymmetric Encryption Padding
PSS Probabilistic Signature Scheme
RIPEMD RACE Integrity Primitives Evaluation Message Digest
RSA Rivest-Shamir-Adleman
SHA Secure Hash Algorithm The components of the system may only use the cryptographic algorithms which are approved according to this embodiment. Cryptographic methods (e.g., authentication or signing) may only be based on these approved cryptographic algorithms. The lengths of the cryptographic keys that are used must at least meet the requirements defined below.

The following key lengths are chosen in such a way that the effort required to break the cryptographic algorithm which uses this key is at least as great as the effort required to break an ideal symmetric 128-bit cipher. Ideal means that the cipher can be broken only by trying out all possible keys. Specifically, AES-128 serves as a comparison cipher.

TABLE 1

Minimum lengths for the unrestrictedly long-term protection of data

| Cryptographic algorithm type, underlying value | Length in bits |
|---|---|
| symmetric, block cipher, stream cipher and signature: key length | 128 |
| asymmetric, discrete logarithm problem (Diffie-Hellman): length of the basic prime number | 3072 |
| asymmetric, factorization problem (RSA): length of the modulus | 3072 |
| asymmetric, discrete logarithm problem on elliptical curves (ECC): length of the underlying curve body and of the private key | 256 |
| hash function: length of the output value | 256 |

If no long-term, but only medium-term or short-term protection is required and the employed keys themselves are similarly used for the medium term or short term only, lengths differing from those indicated here can be used. Certain preconditions must be met for this purpose.

Preconditions for the Use of Shorter Key Lengths

The maximum lifetime of a cryptographic key directly defines the maximum lifetime of the datum which is protected with the key. Is therefore not permissible to protect a datum which requires long-term protection with a key which guarantees a protection that is shorter than the long-term protection. The lifetime of the key begins with its first use. Thus, if a key has a lifetime of, e.g., 15 years, 5 years after its first use it can then only protect data which must be protected for 10 years. In the case of symmetric signatures, the above requirements are dependent on the length of the signature.

A short key length has a negative impact on the level of protection of the signature. The opposite does not apply. This means that a long-term secure key may possibly have to be used even for a short signature.

TABLE 2

Lengths for medium-term protection

| Cryptographic algorithm type, underlying value | Length in bits |
|---|---|
| symmetric, block cipher, stream cipher and signature: key length | 112 |
| asymmetric, discrete logarithm problem (Diffie-Hellman): length of the basic prime number | 2048 |
| asymmetric, factorization problem (RSA): length of the modulus | 2048 |
| asymmetric, discrete logarithm problem on elliptical curves (ECC): length of the underlying curve body and of the private key | 224 |
| hash function: length of the output value | 224 |

TABLE 3

Lengths for short-term protection

| Cryptographic algorithm type, underlying value | Length in bits |
|---|---|
| symmetric, block cipher, stream cipher and signature: key length | 80 |
| asymmetric, discrete logarithm problem (Diffie-Hellman): length of the basic prime number | 1024 |
| asymmetric, factorization problem (RSA): length of the modulus | 1024 |
| asymmetric, discrete logarithm problem on elliptical curves (ECC): length of the underlying curve body and of the private key | 160 |
| hash function: length of the output value | 160 |

Approved Symmetric Block Ciphers

Symmetric block ciphers must be used in one of the modes of operation prescribed below for the symmetric block ciphers.

AES: AES [3] is approved for use. AES is recommended over all other symmetric block ciphers as the standard cipher. Special applications are specified for all other block ciphers.

PRESENT: PRESENT [4] is approved for use if memory space benefits are gained from the 64-bit block length or hardware-supported acceleration is provided.

Approved Stream Ciphers

All approved stream ciphers require both a symmetric key and an initialization vector. Different initialization vectors must be used for the encryption of two different data sets with the same stream cipher and the same symmetric key.

In addition, data encrypted with stream ciphers must be signed separately using an approved method. The signature must be checked during the data decryption and the datum must be rejected in the event of an error.

ChaCha20: A plurality of variants of ChaCha20 [5] exist with different numbers of internal rounds. These are referred to as ChaCha20/X, wherein X indicates the number of rounds. The ChaCha20/12 and ChaCha20/20 variants are approved for use.

A call of ChaCha20 delivers a 512-bit key stream as output. ChaCha20 requires an at least 128-bit long symmetric key and a 128-bit initialization vector. 64 bits of the initialization vector are used for the current position in multiples of 512 bits. The remaining 64 bits are a nonce, which must differ for each generated key stream.

ChaCha20 is highly efficient in software in terms of its RAM (<200 Bytes) and ROM (<500 Bytes) requirement and is therefore recommended for use if other cryptographic algorithms cannot be used due to their size.

Salsa20: Salsa20 [6] is a predecessor of ChaCha20. All requirements and information points that apply to ChaCha20 similarly apply to Salsa20.

ChaCha20 is recommended over Salsa20, except in cases where Salsa20 has to be used for reasons of compatibility.

Approved Asymmetric Algorithms

Elliptic Curve Cryptography (ECC): ECC-based methods are approved for use. Curve25519 and its associated algorithms must be used whenever possible for reasons of efficiency [7,8]. The standardized curves of Brainpool [9] over prime number fields may be used only if the use of Curve25519 is not technically possible. These curves may similarly be used if hardware-supported acceleration is provided for it in the component.

RSA: RSA-based methods are approved for use. The public exponent of an RSA key must be at least 17.

Diffie-Hellman: Diffie-Hellman-based methods over prime number groups are approved for use.

Approved Hash Algorithms

Hash algorithms are used, for example, to check data integrity and serve as components for signature methods. They operate on any volume of data and provide a constant-length fingerprint.

SHA-2: The SHA-2 family (SHA-256, SHA-384, SHA-512) [10] is approved for use.

RIPEMD-160: RIPMED-160 is approved for use, subject to the minimum key length restrictions according to Tables 1-3.

SHA-1: SHA-1 [10] is approved for use, subject to the minimum key length restrictions according to Tables 1-3.

Other hash methods or other integrity-checking methods (checksums, CRC, etc.) may be used in the context of protection concepts. SHA-1 must not be used for new component developments.

If the output length of a hash function is shorter than the required minimum length according to Tables 1-3, it must not be used.

Approved Encryption Methods

The approved symmetric and asymmetric encryption methods must be based on the approved cryptographic algorithms.

If a padding method is required, this padding must be checked for correctness during the decryption and the decrypted datum must be rejected in the event of an error.

The following modes of operation are approved for use for symmetric block ciphers:
Electronic Code Book (ECB) [11];
Cipher Block Chaining (CBC) [11];
Counter (CTR) [11];
Galois/Counter Mode (GCM) [12].

The initialization vector (IV) for CTR mode and GCM must differ for each encryption procedure. This applies to re-encryption also, if only some of the data are re-encrypted. The same requirement applies to random numbers that are used once only (nonces), which must be regenerated with each use.

ECB mode may be used only if the length of the datum to be encrypted is at most as large as the block length of the cipher that is used and the key that is used is used only for the encryption of precisely this one datum.

CTR mode and GCM must not be used without simultaneous use of integrity protection by means of a signature (symmetric or asymmetric). The signature (GMAC) created during the encryption must be used for GCM.

Asymmetric algorithms are not normally used directly for encryption for reasons of efficiency, but are combined with symmetric algorithms to produce hybrid methods. The following methods are approved for use:
ECIES-KEM (ECC-based) ISO/IEC 18033-2;
RSA-OAEP (RSA-based) [13];
RSA-KEM (RSA-based) ISO/IEC 18033-2.

For reasons of efficiency, RSA-OAEP should be used for small data volumes only (data length≤RSA modulus length=8 bits).

ECIES-KEM and RSA-KEM are hybrid methods dependent on key exchange, key derivation, a symmetric cipher and a symmetric signature. The respective requirements must be taken into account in selecting the corresponding algorithms.

Approved Signatures

The following methods are approved as symmetric signatures/Message Authentication Codes (MAC):
HMAC (hash-based) [14];
CMAC (block-cipher-based) [15];
GMAC (block-cipher-based); component of GCM [12];
Poly1305 (algebraic) [16].

Since the required minimum length of a symmetric signature is heavily dependent on the application, a number of examples of output lengths of symmetric signatures are given here as guidelines.

Since the only possibility of attack in the prescribed signature methods is to try out all possible signatures, this is assumed to be the method chosen by an attacker. In the specific applications, an attacker has various restrictions which hinder him in carrying out this brute force attack. These are the possible number of falsification attempts over time and the validity period of the data that he is attempting to falsify.

In practice, both restrictions are normally relevant. The precise impacts on the required signature length must be examined in each case. These restrictions have a direct impact on the required signature length. This is examined more closely below. If a plurality of restrictions are imposed, the shortest minimum length applies.

Restricted number of falsification attempts per time unit:
The restriction of attack attempts per time unit may apply in two ways:

1. The protected function itself limits the attempts over time. This is a direct restriction which must be imposed by the function itself.

2. The interface which the attacker must use has limited transmission capacity. The CAN bus has, e.g., a restricted capacity, which enables only a few thousand attempts per second even at full capacity. This is an indirect restriction which is inherent in the system.

The signature length must be chosen in such a way that, taking account of the restrictions, a brute force attack with full coverage of all possible signatures for one datum requires at least 100 times the lifetime of the key that is used.

The minimum length in bits can be calculated accordingly as follows:

Minimum length=log 2((possible attempts per annum)·(lifetime of the keys in years)·100)

Limited Validity Period of the Data:

Some signed data have a limited validity period. The shorter the data validity period, the shorter the signature that they protect may also be.

If an attacker has to be successful, e.g., once only with the falsification of a signature, since the data are valid for an unlimited time period, a signature with a length of 128 bits is required for long-term protection.

The signature length must be chosen in such a way that, taking account of the restrictions, a brute force attack with full coverage of all possible signatures for one datum requires at least 1000000 times the lifetime of the datum.

The minimum length in bits can be calculated accordingly as follows:

Minimum length=log 2((possible attempts per second)·(Lifetime of the datum in seconds) ·1000000)

Poly1305 requires two secret 128-bit keys K1 and K2. At least K2 must be individual and random each signing procedure. This can be achieved, for example, by the following two variants.

Poly1305-AES: The Poly1305-AES variant uses a 128-bit key K3 and 128-bit nonce for the purpose of key generation. The nonce is encrypted under K3 with AES and serves as K2.

chacha20-poly1305@openssh.com: The chacha20-poly1305@openssh.com variant uses a 256-bit key K3 and 64-bit nonce for the purpose of key generation. The nonce is used as the initialization vector for Chacha20 with the key K3, as a result of which a 512-bit key stream is generated. The keys K1 and K2 are extracted from the latter.

If data are both symmetrically signed and encrypted, the sequence in which these operations are to be carried out must be assessed.

Different keys must be used for encryption and signing. The GCM is excluded from this restriction.

The choice of the signature method depends on the circumstances. The following breakdown can be used as a selection aid. Failure to comply may result in losses in terms of processing speed.

CMAC: Since the CMAC is based on a block cipher, its speed depends directly on the cipher that is used and is therefore approximately as slow as the encryption in CBC mode. The CMAC should therefore be used only with small data volumes or if hardware acceleration is provided.

GMAC: The GMAC as part of the GCM is similarly based on a block cipher, but requires only the additional encryption of a single block. It is therefore recommended to use GMAC if the data to be signed similarly have to be encrypted.

HMAC: The HMAC is based on a hash algorithm and is therefore faster than the CMAC for large data volumes provided that the hash function that is used is faster than the block cipher. It should therefore be used if no hardware support for a symmetric cipher is provided.

Poly1305: In conventional implementations, Poly1305 requires one nonce per signing procedure and also a cryptographic algorithm with an associated key to generate K2 from the nonce. Poly1305 is therefore unsuitable if the generation or transmission of a nonce is not possible.

However, if K2 can be generated efficiently, the calculation of the symmetric signature with Poly1305 is faster than all other approved signature methods.

The following asymmetric signatures are approved for use:

Ed25519 (EdDSA with Curve25519) [7];
ECDSA (ECC-based) [17];
RSA-PSS (RSA-based) [13].

Whenever possible, Ed25519 should be used for reasons of efficiency. ECDSA serves as a second choice, particularly if hardware-supported acceleration is provided in the component.

If the signing method requires random numbers, these must be chosen anew for each signing procedure. In the case of ECDSA, RFC 6979 [18], which describes a deterministic random number generation for ECDSA, must be used for choosing the random number.

If data are both asymmetrically signed and encrypted, the sequence in which these operations are to be carried out must be assessed.

If a padding method is required, this padding must similarly be checked for correctness during the signature verification.

Key Derivation

Key Derivation from Cryptographic Keys

Further keys K1 to Kn can be derived from a cryptographic key K using a key derivation function.

Only symmetric keys and private ECC keys can be derived by means of key derivation functions.

All key derivation functions in which it is not possible to obtain information relating to the original key K from the derived keys K1 to Kn or information from one derived key relating to another derived key are approved for use:

A derived key may at most have the same security level as the key from which it has been derived.

From one key, it is not permissible to derive another key which must have a higher security level than that of the original key.

Specifically, this means that it is not permissible, for example, to derive a symmetric 128-bit key from a symmetric 80-bit key. It would suffice to break the symmetric 80-bit key to calculate the symmetric 128-bit key. A security level of 128 bits would not therefore be provided. However, it is permissible to derive a 256-bit private ECC key from a symmetric 128-bit key, since a 256-bit private ECC key has the security level of a 128-bit symmetric key.

Key Derivation from a Password

The scrypt key derivation function [19] must be used if a key derivation function is used to derive a cryptographic key from a password chosen or readable by a person.

The parameters of the scrypt function must be chosen in such a way that attacks aimed at calculating the password are prevented according to the current prior art. The values p=1, r=8 and N=2^16 are currently sufficient to prevent an effective brute force attack. These parameters require around 16 MB RAM to perform the scrypt function. For the naming of the parameters, see [19].

A number of examples of key derivation functions will be explained below. Cryptographic methods will first be presented which meet the requirements of this embodiment. These examples are substantially simplified and are intended to serve merely to illustrate a possible implementation. Further requirements may possibly need to be taken into account in their implementation.

The following key derivation functions can be used, but are normally not suitable for embedded systems due to their use of resources. They are therefore mentioned here only by way of example. Their specific runtime depends on the respective parameterization.

scrypt [19] (high RAM requirement, long runtime);
PBKDF2 [24] (long runtime);
bcrypt [25] (long runtime);
key derivation according to NIST SP800-108:2009 [26] (suitable depending on the selection of the cryptographic algorithms).

Key derivation functions which are more economical on resources and can also be used in embedded systems are described below.

Figure 4:
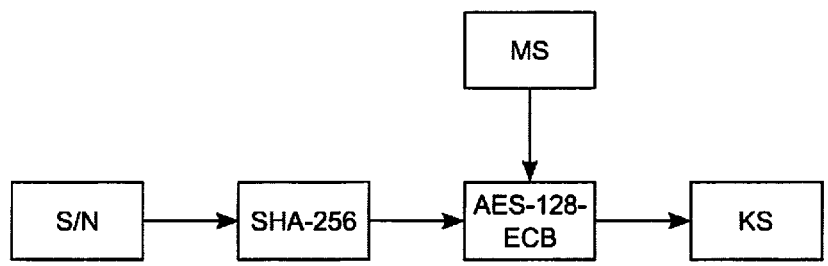
FIG. 4 shows the derivation of a component key from a master key.

According to a first method which is shown in FIG. 4, individual component keys which can be introduced, e.g., during the production of the component are derived from a master key. The component-specific identifier S/N—here the serial number—is used as an input value of an SHA-256 hash function. The resulting cryptographically insecure pseudorandom number is converted to 128 bits and is encrypted with the master key MS via AES. The output value is the 128-bit component key KS. It is not possible to infer other component keys or calculate the master key MS without knowledge of the master key MS. This derivation function thus meets the present requirements for a key derivation function. Furthermore, all keys generated in this way are individual and random for all components. The example shown in FIG. 4 uses AES-128 in ECB mode as a cryptographically secure pseudorandom function. However, other functions with the same characteristics can also be used, e.g., an HMAC based on SHA-256 which simultaneously provides two 128-bit keys at once and allows inputs of any given length.

Figure 5:
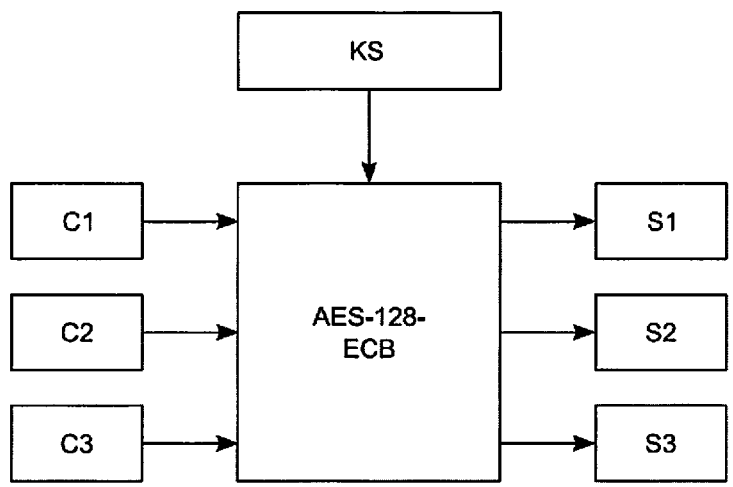
FIG. 5 shows the derivation of a plurality of keys from one component key.

According to a further method which is shown in FIG. 5, a plurality of keys are derived from one component key. This method offers the facility for a component to derive any given number of further keys S1, S2, S3 in runtime from a component key KS stored in a protected manner. This is beneficial if these keys S1, S2, S3 cannot be permanently stored in protected memory. However, the derived, temporary keys S1, S2, S3 for the encryption or signing must also be retained in protected memory, e.g., in the internal RAM. The keys S1, S2, S3 are generated by encrypting different constants C1, C2, C3 with AES in ECB mode with the component key KS. The underlying constants C1, C2, C3 do not have to be protected and may form part of the component software. As in the previous example, AES is used as a cryptographically secure pseudorandom function. A different derivation function with the same characteristics can be used accordingly here also.

Approved Authentication and Identification Methods
Unilateral, Static Authentication In unilateral, static authentication, the recipient checks the data from the sender using a symmetric or asymmetric signature as described above which proves the possession of a secret cryptographic key. Only the authenticity of the data, but not of the sender, is therefore established through unilateral, static authentication. One application is, for example, protected flashing, in which only validly signed data are accepted by the recipient.

Since unilateral, static authentication offers no protection against replay attacks, it may only be used for applications in which such protection is not necessary. The corresponding protection requirement is, therefore, specified for the individual components.

Unilateral, Dynamic Authentication

In unilateral, dynamic authentication, the recipient verifies the authenticity of the communication partner using a challenge-response method. Here, the communication partner responds with a symmetric or asymmetric signature via a challenge from the recipient. This signature proves the possession of a secret cryptographic key. Following a successful verification of the response by the recipient, the communication partner is deemed to be authenticated.

The challenge may either be transmitted explicitly on each connection set-up or may implicitly be a value known to both communication partners, such as, e.g., a counter which is incremented on each connection set-up. The challenge must be different for each connection set-up.

Depending on the application, it is recommended that, after the communication partner has been dynamically authenticated, all data sent by him are also dynamically authenticated. This ensures that the received data actually originate from the authenticated communication partner.

One application is, for example, authenticated diagnosis in which certain diagnostic functions are usable only after a successful authentication.

Bilateral Authentication

In bilateral authentication, both communication partners are authenticated in each case with unilateral dynamic authentication. Following the authentication of both communication partners, all data sent by them may also be authenticated.

Figure 6:
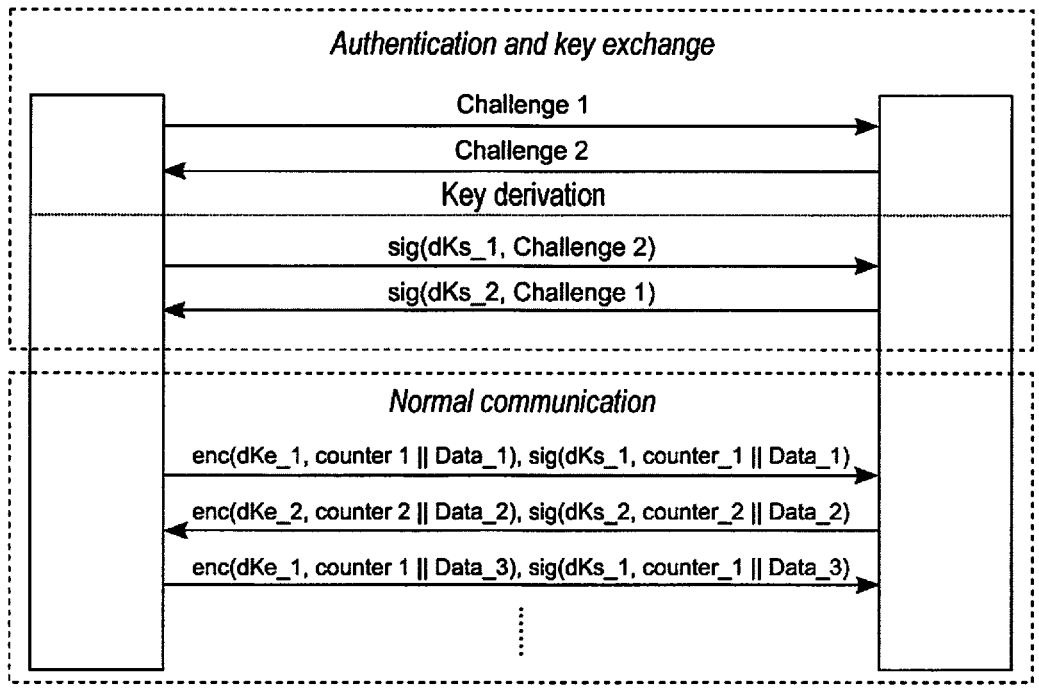
FIG. 6 illustrates the secure communication with bilateral challenge-response authentication.
Figure 6:
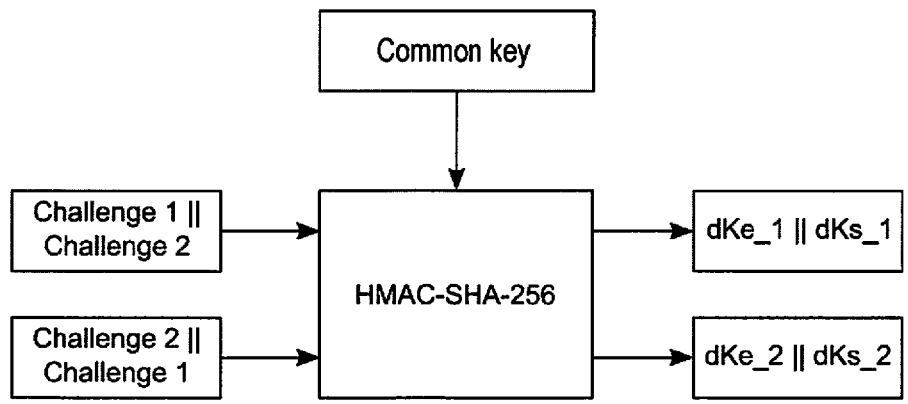

As an example, FIG. 6 illustrates secure communication with bilateral challenge-response authentication. This method describes a communication protocol in which both communication partners use a common symmetric key for authentication and encryption. The method is secure against replay and man-in-the-middle attacks.

The communication process is as follows. Both parties first generate a 128-bit challenge and transmit this to the communication partner. The challenge must be regenerated on each communication set-up. New keys for encryption and signing are then derived from both challenges via the common key. The "∥" symbol denotes the concatenation of values. Each communication direction receives its own set of keys. Both parties respond to their received challenge by transmitting the signature created with the corresponding key via the challenge. Each recipient can check the signature. If the checks are successful, both communication partners are authenticated. The communication proceeds in encrypted and signed form using the derived four keys. Each message is supplemented with a counter, as a result of which replay attacks are prevented. It is recommended to use a hash of the challenges that are used as an initial value.

Approved Methods for the Key Exchange

If two communication partners have to communicate in a protected manner and do not yet have a common symmetric key as a basis for encryption and authentication, but such a key is required, a key exchange method must be used to generate a key.

The following key exchange methods are approved for use:

Elliptic Curve Diffie-Hellman key exchange (ECDH) [20];
Diffie-Hellman key exchange (DH) [20].

DH may be used only if the use of ECDH is not technically possible. Only the approved curves are permitted for ECDH.

To guarantee perfect forward secrecy, the communication participants must generate a new key pair which is used for the key exchange for each key exchange.

Key exchange methods may be used only in conjunction with a simultaneous authentication of the communication. One of the approved methods must be used for authentication.

Random Numbers and Approved Random Number Generators

All random numbers used for cryptographic purposes must have been generated in a cryptographically secure manner. It must not be possible to infer previous or future outputs from outputs of the random number generator that is used. Furthermore, the output random numbers must be distributed approximately uniformly over the entire output range.

Only random number generators of classes PTG.2, PTG.3, DRG.2, DRG.3, DRG.4 and NTG.1 from [21] (defined in [22]) are approved for use.

For the initialization of a class NTG.1 random number generator, adequate and different entropy sources must be used, e.g., current system time, measured temperatures, I/O data, diode noise, start-up behavior, runtime measurements or external sources.

Before a random number generator may be used, it must be initialized with at least 128-bit entropy.

The post-processing function of a class PTG.2 random number generator must be an approved hash algorithm.

The output of a class PTG or NTG random number generator must be used for the initialization of a DRG class random number generator.

Figure 7:
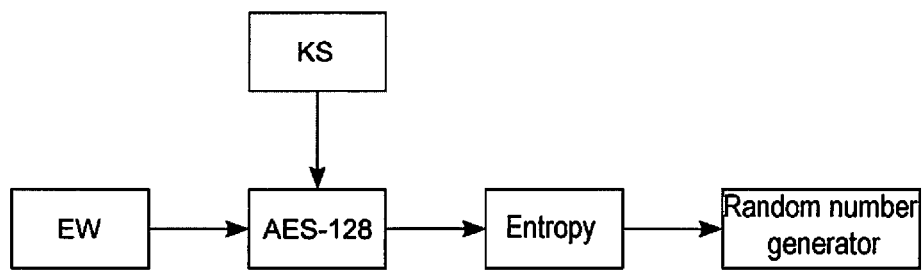
FIG. 7 illustrates the extraction of entropy from a previously introduced key for the initialization of a random number generator.

Similar to the generation of further keys from a component-specific random key, the entropy of an introduced key can be used for the initialization of a random number generator. This is helpful if a collection of entropy cannot be guaranteed by the component itself. The corresponding method is illustrated in FIG. 7.

An input value EW is encrypted with a 128-bit long key KS via AES and the result is used for the initialization of a random number generator. The level of the entropy supplied in this way corresponds to the entropy of the key, i.e., 128 bits. It must be noted that a random number generator must not be initialized multiple times by the same value. This can be avoided, for example, by using a strictly monotonically increasing counter as the input value to be encrypted. This counter is incremented before its use, is retained and then used as an input value. It is thus ensured that the same counter and therefore the same value are not used multiple times to initialize the random number generator. Instead of AES, a different derivation function such as HMAC can also be used.

The dieharder test suite [23] can be used to establish whether fundamental problems have occurred in the implementation of a random number generator. However, it cannot guarantee that the implementation is error-free, or whether the above requirements for the random number generator have been met.

REFERENCES

[1] enisa: Algorithms, Key Sizes and Parameters Report 2013 recommendations, version 1.0
[2] ECRYPT II: ECRYPT II Yearly Report on Algorithms and Keysizes (2011-2012)
[3] NIST: Announcing the ADVANCED ENCRYPTION STANDARD (AES), FIPS PUB 197
[4] A. Bogdanov, L. R. Knudsen, et al.: PRESENT: An Ultra-Lightweight Block Cipher
[5] D. J. Bernstein: ChaCha, a variant of Salsa20
[6] D. J. Bernstein: The Salsa20 family of stream ciphers
[7] Daniel J. Bernstein, Tanja Lange et al.: High-speed high-security signatures
[8] D. J. Bernstein: Curve25519: new Diffie-Hellman speed records
[9] RFC 5639 Elliptic Curve Cryptography (ECC) Brainpool Standard Curves and Curve Generation
[10] NIST: Secure Hash Standard (SHS), FIPS PUB 180-4
[11] NIST: Recommendation for Block Cipher Modes of Operation, NIST Special Publication 800-38A
[12] NIST: Recommendation for Block Cipher Modes of Operation: Galois/Counter Mode (GCM) and GMAC, NIST Special Publication 800-38D
[13] RFC 3347 Public-Key Cryptography Standards (PKCS) #1: RSA Cryptography Specifications Version 2.2
[14] NIST: The Keyed-Hash Message Authentication Code (HMAC), FIPS PUB 198-1
[15] NIST: Recommendation for Block Cipher Modes of Operation: The CMAC Mode for Authentication, NIST Special Publication 800-38B
[16] D. J. Bernstein: The Poly1305-AES message-authentication code
[17] NIST: Digital Signature Standard (DSS), FIPS PUB 186-4
[18] RFC 6979 Deterministic Usage of the Digital Signature Algorithm (DSA) and Elliptic Curve Digital Signature Algorithm (ECDSA)
[19] C. Percival: Stronger key derivation via sequential memory-hard functions
[20] NIST: Recommendation for Pair-Wise Key Establishment Schemes Using Discrete Logarithm Cryptography, NIST Special Publication 800-56A, Revision 2
[21] BSI: Funktionalitasklassen and Evaluationsmethodologie für deterministische Zufallszahlengeneratoren, AIS 20, Version 3 [*Functionality Classes and Evaluation Methodology for Deterministic Random Number Generators, AIS 20, Version 3*]
[22] W. Killmann, W. Schindler: A proposal for: Functionality classes for random number generators
[23] Robert G. Brown et al.: Dieharder: A Random Number Test Suite, Version 3.31.1
[24] RFC 2898 PKCS #5: Password-Based Cryptography Specification Version 2.0
[25] D. Mazières: A Future-Adaptable Password Scheme
[26] NIST: Recommendation for Key Derivation Using Pseudorandom Functions, NIST Special Publication 800-108

The invention claimed is:

1. A control unit for connecting to a data bus of a motor vehicle, the control unit comprising:
  a memory including instructions stored therein; and
  a processor that executes the instructions stored in the memory,
  wherein the control unit implements at least one cryptographic functionality based on a specified selection of cryptographic functions, methods and/or protocols,
  wherein a plurality of selectable cryptographic functions are reduced to only the number of cryptographic functions that are usable in the motor vehicle, wherein the reduced number of selectable cryptographic functions is further configured to the memory and/or processing requirements of the control unit for the specified selection of cryptographic functions, methods and/or protocols,
  wherein minimum lengths are defined for a cryptographic key which is used for the implementation of the at least one cryptographic functionality, wherein the reduced number of selectable cryptographic functions are specified according to both cryptographic functions and to the defined minimum cryptographic key lengths, and a selection of the at least one cryptographic functionality for implementation is made depending on memory available to the control unit, processing power or an allowed processing time.

2. The control unit of claim 1, wherein the specified selection of cryptographic functions, methods and protocols specifies requirements for one or more of the following areas: block ciphers, stream ciphers, asymmetric algorithms, hash algorithms, encryption methods, signatures, key derivation, authentication, identification, key exchange and random number generators.

3. The control unit of claim 1, wherein the implemented cryptographic functionality is a signature, the signature length of which is chosen depending on the transmission capacity of the data bus.

4. A method for implementing a cryptographic functionality in a control unit for connecting to a data bus of a motor vehicle, the method comprising:

reducing a plurality of selectable cryptographic functions to only the number of cryptographic functions that are usable in the motor vehicle;

choosing at least one cryptographic function, one cryptographic method or one cryptographic protocol based on a specified selection of cryptographic functions, methods and protocols, wherein the reduced number of the selectable cryptographic functions is further configured to the memory and/or processing requirements of the control unit for the specified selection of cryptographic functions, methods and/or protocols;

defining a minimum length for a cryptographic key which is used for the chosen cryptographic function, the chosen cryptographic method or the chosen cryptographic protocol; and implementing the cryptographic functionality using the chosen cryptographic function, the chosen cryptographic method or the chosen cryptographic protocol with at least the defined minimum length of the cryptographic key, wherein the reduced number of selectable cryptographic functions are specified according to both cryptographic functions and to the defined minimum cryptographic key lengths, and a selection of the at least one cryptographic functionality for implementation is made depending on memory available to the control unit, processing power or an allowed processing time.

5. The method of claim 4, wherein the specified selection of cryptographic functions, methods and protocols specifies requirements for one or more of the following areas: symmetric block ciphers, stream ciphers, asymmetric algorithms, hash algorithms, encryption methods, signatures, key derivation, authentication, identification, key exchange and random number generators.

6. The method of claim 4, wherein the implemented cryptographic functionality is a signature, the signature length of which is defined depending on the transmission capacity of the data bus.

7. A system comprising two or more data bus connection control units interconnected via a data bus of a motor vehicle, wherein each of the data bus connection control units implements at least one cryptographic functionality, wherein the implementation of the at least one cryptographic functionality is based on a specified selection of cryptographic functions, methods and/or protocols, wherein a plurality of selectable cryptographic functions are reduced to only the number of cryptographic functions that are usable in the motor vehicle, wherein the reduced number of the selectable cryptographic functions is further configured to the memory and/or processing requirements of the control unit for the specified selection of cryptographic functions, methods and/or protocols, wherein minimum lengths are defined for a cryptographic key which is used for the implementation of the at least one cryptographic functionality, wherein the reduced number of selectable cryptographic functions are specified according to both cryptographic functions and to the defined minimum cryptographic key lengths, and a selection of the at least one cryptographic functionality for implementation is made depending on memory available to the control unit, processing power or an allowed processing time.

8. A motor vehicle comprising two or more data bus connection control units interconnected via a data bus, wherein each of the data bus connection control units implements at least one cryptographic functionality, wherein the implementation of the at least one cryptographic functionality is based on a specified selection of cryptographic functions, methods and/or protocols, wherein a plurality of selectable cryptographic functions are reduced to only the number of cryptographic functions that are usable in the motor vehicle, wherein the reduced number of the selectable cryptographic functions is further configured to the memory and/or processing requirements of the control unit for the specified selection of cryptographic functions, methods and/or protocols, wherein minimum lengths are defined for a cryptographic key which is used for the implementation of the at least one cryptographic functionality, wherein the reduced number of selectable cryptographic functions are specified according to both cryptographic functions and to the defined minimum cryptographic key lengths, and a selection of the at least one cryptographic functionality for implementation is made depending on memory available to the control unit, processing power or an allowed processing time.

9. The control unit of claim 1, wherein the minimum length of the cryptographic key is defined based on a calculation including a possible number of attempts to brute force attack the cryptographic key and a lifetime of the cryptographic key.

10. The control unit of claim 9, wherein the possible number of attempts to brute force attack the cryptographic key is calculated based on at least one restriction imposed on attack attempts for a predefined time period.

11. The control unit of claim 10, wherein the at least one restriction is a direct restriction imposed by the at least one cryptographic functionality.

12. The method of claim 4, wherein defining the minimum length of the cryptographic key comprises calculating the minimum length based on a possible number of attempts to brute force attack the cryptographic key and a lifetime of the cryptographic key.

13. The method of claim 12, wherein the possible number of attempts to brute force attack the cryptographic key is calculated based on at least one restriction imposed on attack attempts for a predefined time period.

14. The method of claim 13, wherein the at least one restriction is a direct restriction imposed by the at least one cryptographic functionality.

15. The system of claim 9, wherein the minimum length of the cryptographic key is defined based on a calculation including a possible number of attempts to brute force attack the cryptographic key and a lifetime of the cryptographic key.

16. The system of claim 15, wherein the possible number of attempts to brute force attack the cryptographic key is calculated based on at least one restriction imposed on attack attempts for a predefined time period.

17. The system of claim 16, wherein the at least one restriction is a direct restriction imposed by the at least one cryptographic functionality.

18. The motor vehicle of claim 10, wherein the minimum length of the cryptographic key is defined based on a calculation including a possible number of attempts to brute force attack the cryptographic key and a lifetime of the cryptographic key.

19. The motor vehicle of claim 18, wherein the possible number of attempts to brute force attack the cryptographic key is calculated based on at least one restriction imposed on attack attempts for a predefined time period.

20. The motor vehicle of claim 19, wherein the at least one restriction is a direct restriction imposed by the at least one cryptographic functionality.

* * * * *